United States Patent Office 3,532,235
Patented Oct. 6, 1970

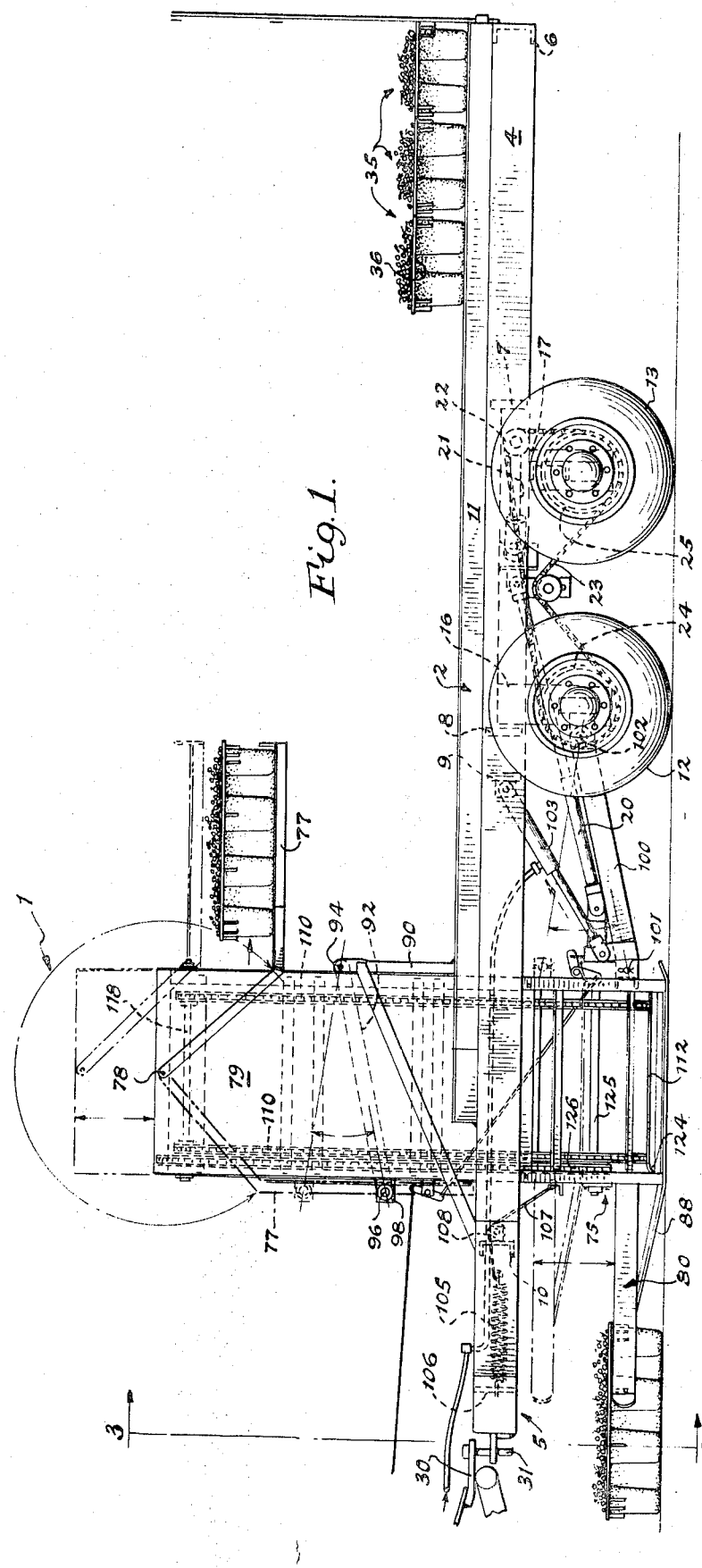

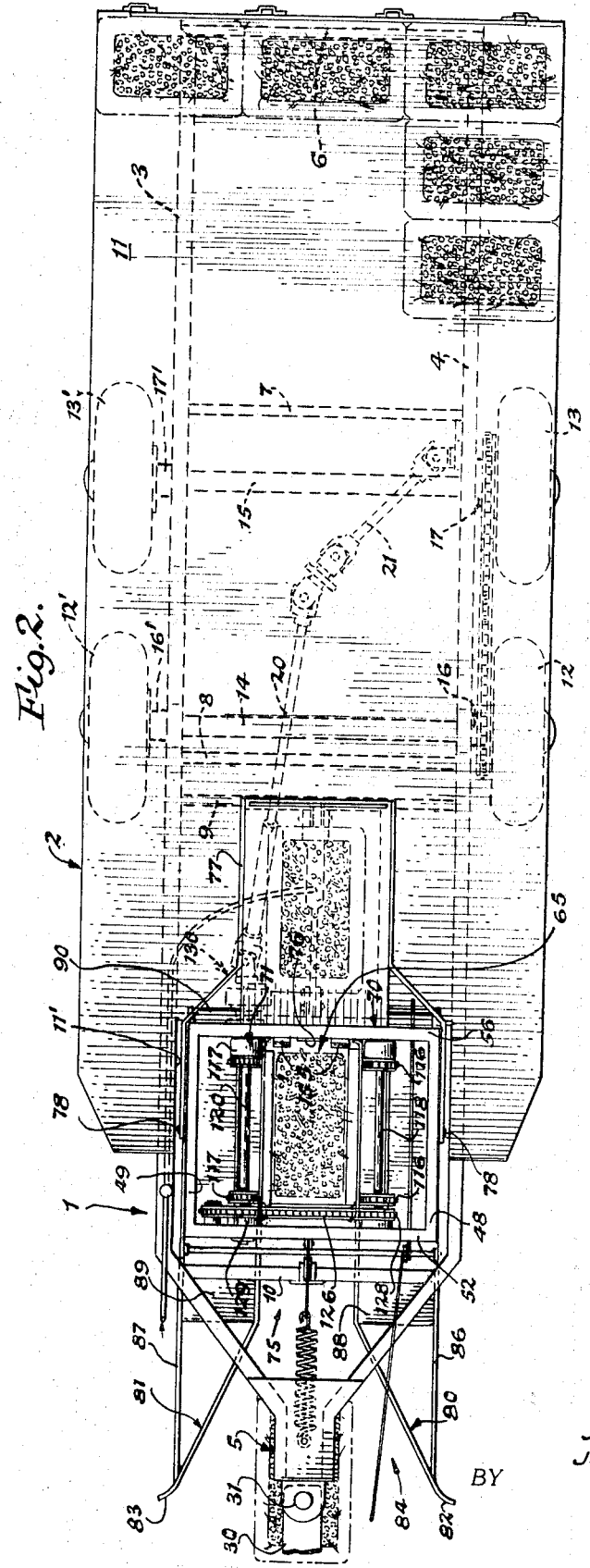
INVENTORS
JAMES V. RENALDO
JOHN J. RENALDO JR.
ATTORNEYS

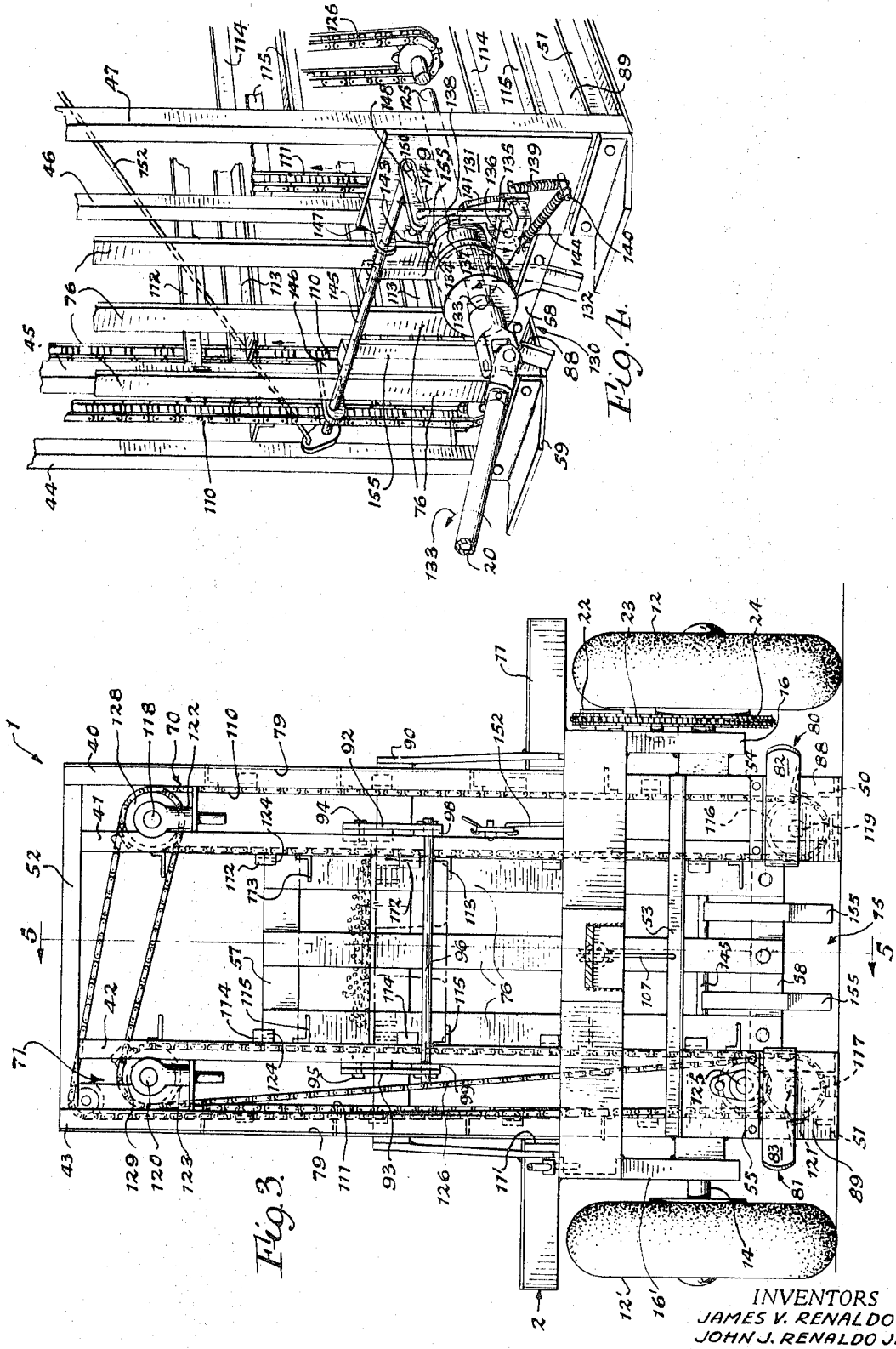

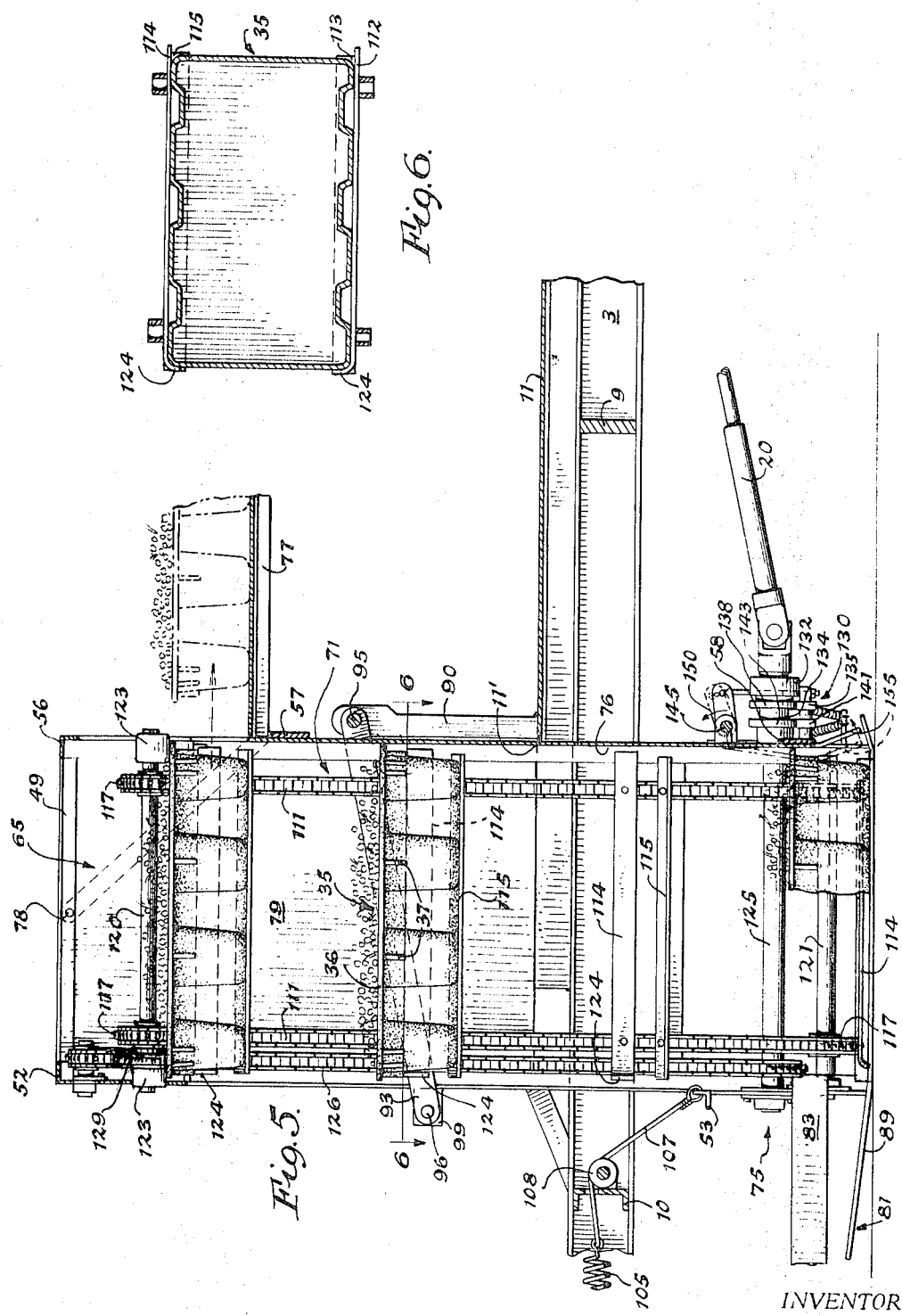

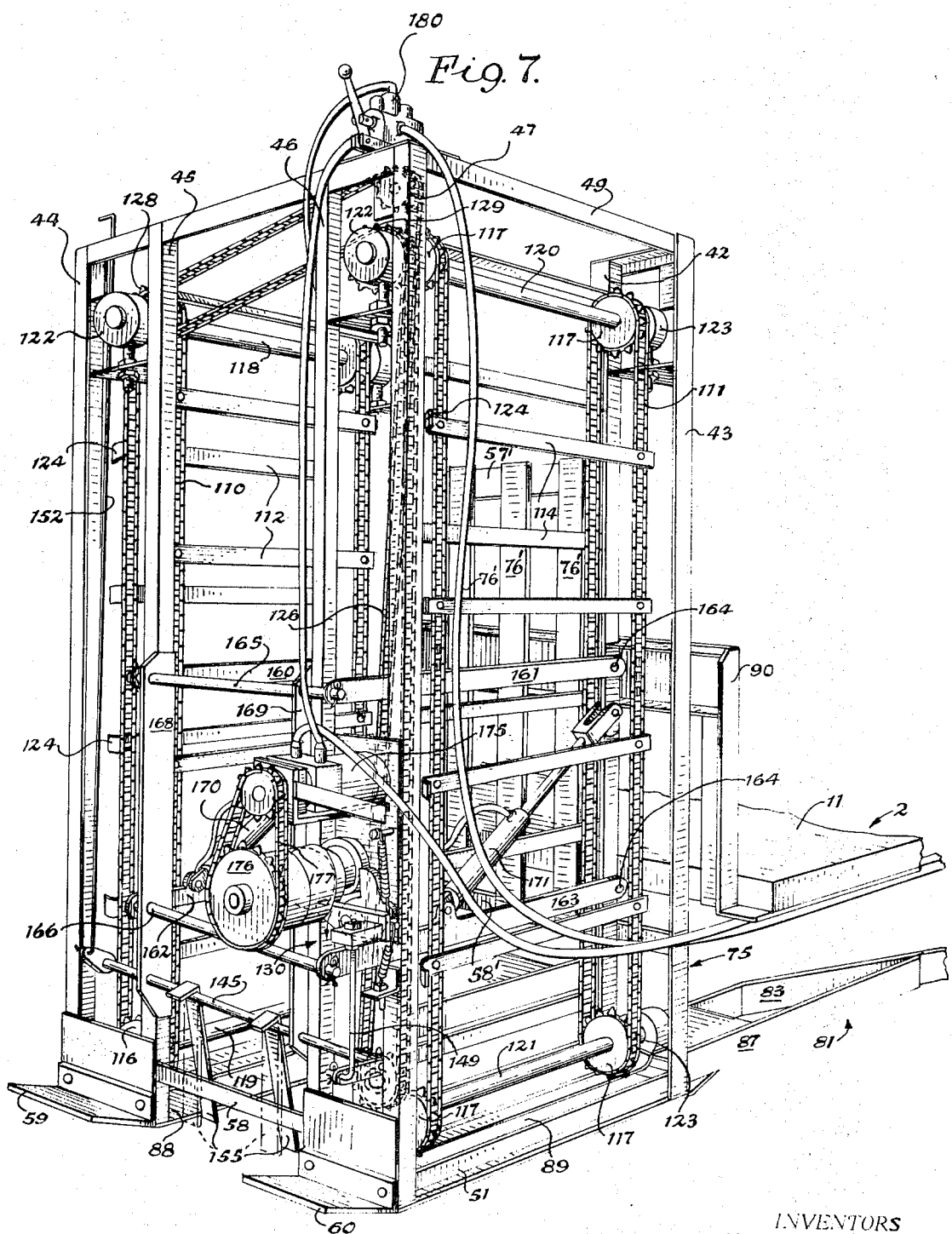

3,532,235
GRAPE CRATE LIFTING UNIT
James V. Renaldo, Mile Strip Road, and John J. Renaldo, Jr., Rte. 249, both of North Collins, N.Y. 14111
Filed Aug. 19, 1968, Ser. No. 753,552
Int. Cl. B60p 1/02
U.S. Cl. 214—357
11 Claims

ABSTRACT OF THE DISCLOSURE

A crate lifting unit adapted to be supported on a vehicle and employed, when the vehicle is moved along rows of a crop being harvested, to automatically pick up crop depository crates disposed on the ground between the rows and lift same onto the vehicle.

BACKGROUND OF THE INVENTION

In the grape and like crop industries, wherein the crop is normally hand picked or harvested, it is the practice for workers to deposit the harvested crop in depository crates, which when filled are placed on the ground between adjacent rows being harvested.

Due to the weight of the filled crates and the distance therethrough which they must be carried to a convenient collection point, it has become the practice particularly in large fields to pull a wheeled vehicle, such as a flat bed wagon, along the harvested rows for the purpose of collecting the filled crates. While this procedure does expedite crate collection, it suffers from the drawback that one or more additional ground workmen or loaders must be employed to lift the crates from the ground onto the wagon, whereafter a workman standing on the wagon is required to properly arrange the crates.

Various attempts have been made to devise automatic lifting machines in an effort to avoid the manual crate loading operation. However, so far as we are aware there has not been previously produced a machine which will satisfactorily pick up and load crates regardless of crate orientation and the unevenness of the ground on which the crates are deposited.

SUMMARY OF THE INVENTION

In accordance with the preferred embodiment of the present invention there is provided a lift unit supported adjacent the forward end of a wheeled vehicle, which is adapted, when the vehicle is drawn along harvested rows to engage successive crates disposed on the ground between rows, orient the engaged crates into a proper lifting position and thereafter automatically lift the oriented crates to a point convenient to a crate arranging workman positioned on the vehicle. The lifting unit is supported for relative vertical movement with respect to the vehicle in order to permit the unit to follow the contour of the ground on which the crates are positioned and to permit the unit to be elevated into an inoperative transporting position.

The invention contemplates the utilization of a clutch operated by the presence of an orientated crate to drivingly connect the crate lifting mechanism of the unit to either a hydraulic motor, continuously operated by a vehicle drawing tractor, or a drive shaft powered by the wheels of the drawn vehicle.

The present invention additionally contemplates a simplified lifting unit construction, which permits installation thereof on the rear of various types of drawn vehicles without the need for significant structural modification of the vehicle.

DRAWINGS

The nature and mode of operation of the lifting unit of the present invention will be more fully understood by reference to the following description taken with the accompanying drawings wherein:

FIG. 1 is a side elevational view showing the lifting unit mounted on the front end of a wheeled vehicle;

FIG. 2 is a top plan view of the unit and vehicle construction shown in FIG. 1;

FIG. 3 is a sectional view taken generally along the line 3—3 in FIG. 1;

FIG. 4 is a fragmentary perspective view of the rear of the lifting unit, but with portions of the vehicle being broken away to expose the drive clutch and actuating bar therefor;

FIG. 5 is a sectional view taken generally along the line 5—5 in FIG. 3, but with portions broken away for clarity;

FIG. 6 is a sectional view taken generally along the line 6—6 in FIG. 5; and

FIG. 7 is a perspective view showing alternative embodiment of the lifting unit mounted adjacent the rear of a drawn vehicle.

DETAILED DESCRIPTION

Now referring to FIGS. 1 and 2 it will be seen that the lifting unit of the preferred embodiment of the present invention is generally designated as 1 and is adapted to be mounted adjacent the forward end of a drawn vehicle, such as wagon 2.

While the specific structure of wagon 2 forms no part of the present invention, it is shown for purposes of reference as including a pair of lengthwise extending channel members 3 and 4, which are joined adjacent their forward ends by a hitch assembly, generally designated as 5; a plurality of transversely extending channel member braces 6–10; a sheet metal wagon bed 11, which is supported on channel members 3 and 4 and cut out as at 11′ to receive lifting unit 1; and pairs of ground support wheels 12, 12′ and 13, 13′, which are carried on the ends of axles 14 and 15, which are in turn journaled in channel member mounted brackets 16, 16′ and 17, 17′, respectively.

A convenient source of power for driving the lifting unit in the manner to be hereinafter described is provided by telescopic drive shaft 20, which is universally connected by intermediate drive shaft 21 to drive pinion 22. As best shown in FIG. 1, drive pinion 22 is driven by an endless drive chain 23 trained about pinions 24, 25, affixed for rotation with wheels 12 and 13.

Wagon 2 may be drawn between rows of harvested crops by suitable means such as a tractor, not shown, having a tongue 30, pin connected to hitch assembly 5 as at 31.

To facilitate understanding of the present invention it will be understood at the outset that as wagon 2 is drawn along between harvested rows, lifting unit 1 is adapted to be drawn into engagement with crop containing crates, generally designated as 35, which have been filled by pickers and left on the ground at various points lengthwise of the harvested rows. While the design of crate 35 is conventional and thus forms no part of the present invention, the crates are shown for purpose of illustration as being generally rectangular when viewed in plan and as having a continuous flange 36 bounding the open mouth of the crate, which is reinforced by a plurality of crate side wall flanges 37 to permit the continuous flange to serve as a hand grip for lifting the crate.

Lifting unit 1 is shown in the figures as including a suitably supporting framework defined by a plurality of front and rear vertically rising angle irons 40–43 and 44–47, respectively, which are joined lengthwise of wagon 2 by a pair of horizontally disposed upper angle irons 48, 49 and a pair of horizontally disposed lower angle irons 50, 51. Transverse positioning of front angle irons 40–43 may be effected by horizontally disposed brace member 52–53, while transverse positioning of rear angle irons 44–47 may be effected by horizontally extending brace members 56–60.

The framework thus far described generally defines a vertically extending shaft, designated as 65, upwardly through which crates 35 may be lifted by an elevator, including a pair of facing, framework mounted, vertically travelling conveyors 70, 71.

It will be understood that, as wagon 2 is drawn along the harvested rows, successvely encountered crates 35 may be admitted adjacent the bottom of shaft 65 through a forwardly opening inlet, which is generally designated as 75 and defined by front vertical rising angle irons 41, 42 and brace member 53. After passing completely through inlet 75, crates 35 are adapted to be engaged by vertically extending guide members 76, which are carried on brace members 56, 57 and adapted to force the crates to move forwardly with unit 1. Crates being lifted through shaft 65 by conveyors 70, 71 in the manner to be more fully hereinafter described may be removed by a workman standing on wagon bed 11, either upwardly through the open top of the shaft or rearwardly through an outlet defined by rear vertically rising angle irons 45, 46 and brace members 56, 57. After removal of the crates, they may be arranged on wagon 2 starting from the rear as indicated in FIGS. 1 and 2. Removal of crates 35 may be facilitated by the provision of a crate resting or guide platform 77, which may be pivotally affixed to the unit framework, as at 78, for movement between crate supporting full line and inoperative phantom line positions shown in FIG. 1.

In order to protect workmen from possible injury due to contact with conveyors 70, 71, sheet metal plates 79 are suitably affixed to the sides of the unit framework.

Affixed adjacent to the lower ends of framework angle irons 40–43 are a pair of crate orienting guide assemblies, which are generally designated as 80, 81 and include a pair of guide bars 82, 83. Guide bars 82, 83, which extend forwardly from adjacent facing surfaces of front framework angle irons 41, 43 and diverge adjacent the forwardly extending ends thereof to define a crate receiving entrance shown generally at 84, may be braced, as at 86, 87. Preferably, assemblies 80, 81 include transversely spaced apart sheet metal support shoes 88, 89, which extend rearwardly beneath the framework to provide a ground engaging support surface thereof.

Unit 1 may be movably supported on wagon mounted bracket 90 by a parallelogram arrangement having an upper portion defined by a pair of linkage arms 92, 93 which are pin connected adjacent the rearwardly extending ends thereof to bracket 90, as at 94, 95. The forwardly extending ends of linkage arms 92, 93 are adapted to freely receive the ends of a support rod 96, which is journaled in brackets 98, 99 carried on front angle irons 41, 42, respectively. The lower portion of the parallelogram support is shown only in FIG. 1 as including a single linkage arm 100, which is pin connected, as at 101, on the forwardly extending end thereof to transverse member 58, and pin connected, as at 192, on the rearwardly extending end thereof to a suitable bracket, not shown, provided on axle 14. Positioninng of the framework between its lower or ground engaging operative position and its upper inoperative position, shown in solid and phantom lines, respectively, in FIG. 1, may be effected by means of hydraulic cylinder 103. The respective ends of cylinder 103 are pin connected to linkage arm 100 and wagon transverse brace 9. During normal operation, fluid may be freely circulated through cylinder 103 to permit the framework to rise and fall in accordance with the contour of the ground. Preferably, possible shock to the framework due to abrupt lowering of ground elevation is minimized by the provision of a shock absorbing tension spring 105, which has one end connected to hitch assembly 5, as at 106, and has the other end thereof connected to framework brace member 53 by cable 107 passing over guide pulley 108.

Now referring particularly to FIGS. 2, 3 and 5, it will be seen that vertically travelling conveyors 70, 71, which define opposite sides of shaft 65, include pairs of link chains 110 and 111, which are adapted to carry aligned pairs of crate positioning and support members 112, 113, and 114, 115, respectively, which are equally spaced apart lengthwise of the conveyors, as clearly shown in FIGS. 3 and 5. Link chains 110, 111 are trained about pulleys 116, 117, which are affixed for rotation with upper and lower conveyor mounting shafts 118, 119 and 120, 121, respectively. The ends of conveyor mounting shafts 118, 119 and 120, 121 may be journaled in suitable framework mounted bearings 122, 123, respectively.

It will be understood upon referring to FIGS. 3 and 5 that when conveyors 70, 71 are synchronously driven upon the positioning of a ground supported crate at the bottom of shaft 65, as will hereinafter be described, crate positioning members 112, 114 are forced to move inwardly and upwardly into engagement with the bottoms of crate side re-inforcing flanges 37 to effect initial lifting of the crate, whereafter generally L-shaped support members 113, 115 are forced to move inwardly and upwardly into supporting engagement with the lower surface of such crate. Preferably, crate positioning members 112, 114 are deformed adjacent the forwardly extending ends thereof to provide inturned flange portions 124, which are adapted to cooperate with guide members 76 to prevent horizontal movement of a supported crate during lifting thereof upwardly through shaft 65.

Conveyors 70, 71 may be synchronously driven by a driving shaft 125, which is drivingly connected by link chain 126 to sprockets 128, 129 affixed for rotation with conveyor mounting shafts 118 and 120, respectively. Driving shaft 125 may be selectively connected to telescopic drive shaft 20 by means of clutch assembly, generally indicated as 130, which is carried on rear framework support bracket 131. While clutch assembly 130 may be of any desired type, e.g. friction, magnetic, hydraulic or ball bearing lock, it is shown for purposes of illustration as being a ball bearing lock clutch including a driving part 132, which is universally connected to and adapted to be continuously driven by telescopic drive shaft 20 in the direction indicated by arrow 133, and a driven part 134, which is affixed for rotation with conveyor driving shaft 125. Driven rotation of clutch part 134 by clutch part 132 in the direction of arrow 133, is normally prevented by a stop or lock 135, which is pivotally supported on a bracket mounted support pin 136 and adapted to be received within a notch 137 provided in first cam member 138 of clutch part 134. Stop 135 is normally biased into engagement with the surface of cam member 138 by a tension spring 139 affixed to support bracket 131 by pin 140. Rotation of clutch part 134 in a direction opposite to arrow 133 is prevented by a stop member 141, which is pivotally supported on bracket mounted support pin 136 and receivable within notch 142 provided in second cam member 143 of clutch part 134. Stop 141 is normally pivoted into engagement with the surface of second cam member 143 by a tension spring 144, which is also carried on support 131 by pin 140.

Stop 135 may be selectively pivoted from engagement with notch 137 of first cam member 138 to permit driven rotation of conveyor drive shaft 125 in the direction indicated by arrow 133 by a control linkage including a control rod 145, which is journaled in rear framework brackets 146, 147; control rod mounted bracket 148, and connecting arm 149. It will be understood that control rod 145 may be rotated in the direction indicated by arrow 150 to remove stop 135 from first cam member notch 137 either by a tractor operator via a linkage generally designated as 152, or by engagement of the rear surface of a crate 35 with a pair of feeler plates 155 affixed to control rod 145, as by welding. By referring particularly to FIGS. 4 and 5, it will be apparent that tension spring 139, which is associated with stop 135 normally functions to maintain feeler plates 155 in their inoperative or full lined position, indicated in FIG. 5, wherein the feeler plates project forwardly of brace 58 between guide members 76. Upon engagement of feeler plates 155 with a crate passing through shaft opening inlet 75, the feeler plates are adapted to be pivoted rearwardly into an operative or phantom line position, indicated in FIG. 5, wherein they are disposed flush with the forwardly facing guide surface of guide members 76 and stop 135 is removed from notch 137 against the return bias of spring 139.

FIG. 7 illustrates a modified embodiment of the lifting unit according to the present invention, wherein like parts are similarly designated. In this embodiment, however, wagon mounted support bracket 90 is suitably affixed adjacent the rear end of wagon 2, and the framework movably supported thereon by a parallelogram arrangement including upper and lower linkage arms 160, 161 and 162, 163, which have the forwardly extending ends thereof pin connected to bracket 90, as at 164, and the rearwardly extending ends thereof journaled on vertically spaced shafts 165, 166, respectively, carried on rear framework brackets 168, 169.

Vertical movement of the unit shown in FIG. 7 may be effected by a pair of simultaneously operable hydraulic cylinders 170, 171, whose ends are pivotally connected to bracket 90 and to lower linkage arms 162, 163, respectively. As in the case of cylinder 103, oil may freely circulate through cylinders 170, 171 during normal operation of the unit to permit it to move freely in a vertical direction in order to follow variations in the contour of the ground.

Further, in FIG. 7 there is illustrated a modified drive for conveyor 70, 71, which includes a hydraulic motor 175, which is drivingly connected to a sprocket 176 carried on driving clutch part 132 by a link chain 177. A suitable manually operable control valve 180, conveniently mounted on the framework of the unit is provided to control operation of motor 175, which normally runs continuously during operation of the unit, and/or operation of cylinders 170, 171.

It will be noted that in the embodiment illustrated in FIG. 7, L-shaped support brackets 113 and 115 are omitted, since it has been found that only positioning members 112, 114 are necessary when crate flange 36 is sufficiently strong.

The embodiment shown in FIG. 7 further differs from that previously described in that vertically rising guide members 76 are disposed adjacent shaft inlet 75, whereas the inturned flanges 124 of positioning members 112, 114 are positioned at the rear of the unit adjacent to feeler plates 155. Stop shaft 182, which is carried on rear framework brackets 168, 169, is empolyed to limit rearward pivotal movement of feeler plates 155 upon operation thereof. Thus, in this arrangement feeler plates 155 not only serve to actuate the clutch control linkage, when moved rearwardly from their normally forward inoperative position into their rearward operable position by the presence of the ground supported crate, but initiate forward movement of such crate with the unit. Then, after positioning members 112, 114 are brought upwardly into engagement with opposite sides of such crate, inturned flanges 124 cooperate with guide members 76 to constrain horizontal movement of the crate during lifting thereof. By reversing the positioning of inturned flanges 124 and guide members 76, a workman standing on the wagon bed may remove lifted crates through a forwardly facing shaft outlet.

The first embodiment of the lifting unit in accordance with the present invention offers the decided advantage that it is placed at the forward end of the wagon and thus under the close supervision of the operator of the towing vehicle. However, the second embodiment does offer the advantage that it may be readily mounted on the rear of any wagon structure without the requirement that the wagon be substantially modified or cut away as is necessary with a front mounted unit, and the advantage that there is no tendency for the unit to "dig in" when extremely muddy ground conditions are encountered, as is sometimes the case with front mounted units.

The overall operation of the several units discussed is substantially the same. In each embodiment, as wagon 2 is drawn forwardly between rows, the unit is ground supported by shoes 88, 89 and adapted to be moved vertically with respect to the wagon in accordance with changes in ground elevation. When the guide assemblies 80, 81 are brought into engagement with a ground supported crate, they cooperate to effect orientation of the crate so as to insure that a pair of opposed crate sides are arranged parallel to the path of wagon travel, and thereafter serve to guide the oriented crate rearwardly through shaft inlet 75 into oriented position intermediate conveyors 70, 71, whereupon the rearwardly facing surface of the oriented crate operably moves feeler plates 155 into their operative position to initiate the lifting operation. In each case, during lifting, vertical guide members 76 and flanges 124 cooperate to effect horizontal positioning of lifted crates.

It will be understood that the oriented crates, when disposed intermediate the conveyors are normally somewhat tilted with respect to the horizontal, since the ground between rows is seldom flat. Such tilting may be about a horizontal axis, which is disposed either parallel to or transversely of the path of wagon travel. Experience has shown, however, that so long as the lower surface of the crate to be lifted is ground supported, the positioning members 112, 114 are effective to pick up such crate and effect horizontal positioning thereof for travel upwardly through the elevator shaft.

While two embodiments of the lifting unit of the present invention have been described in detail, it is likely that additional embodiments or modifications thereof will likely occur to one skilled in the art in view of the foregoing description. Exemplary thereof would be to omit the clutch and continuously driven power source mechanisms described and substitute therefor an electric or other suitable motor operable only upon movement of the feeler plates. Additionally, suitable electric eyes or microswitches could be substituted for the pivotally supported feeler plates. Still further, while the apparatus would be by far less reliable the conveyors could be continuously driven.

Accordingly, we wish to be limited only by the scope of the appended claims wherein:

1. A lifting unit adapted to be mounted on a vehicle movable along a path of travel lengthwise of crop rows in order to bring said unit into engagement with harvested crop depsitory crates disposed on the ground between adjacent crop rows, which comprises: an elevator including a pair of spaced vertically traveling conveyors adapted to lift said crates from the ground, when positioned in an oriented position intermediate said conveyors adjacent a forwardly opening inlet of said elevator, and to convey lifted crates in succession upwardly while in horizontally arranged, vertically spaced relationship to an upper elevator outlet, said conveyors having a plurality of lifting means uniformly spaced apart in the direction of conveyor travel, individual lifting means of said spaced conveyors being disposed in horizontal alignment and being adapted during conveyor travel to be brought into lifting engagement with opposed sides of a positioned crate; guide means disposed adjacent said elevator inlet, said guide means when moved into engagement with a ground supported crate being adapted to effect orientation thereof such that said opposed sides thereof are disposed parallel to said path of vehicle travel and to guidingly direct said oriented crate through said elevator inlet into said oriented position intermediate said conveyors; and means to synchronously drive said conveyors such that said conveyor lifting means are brought into lifting engagement with opposed sides of said positioned crate, said drive means including means adapted to be continuously driven, clutch means for selectively connecting said continuously driven means to said conveyors, and control means adapted when actuated to operate said clutch means to drivingly connect said continuously driven means to said conveyors.

2. A lifting unit according to claim 1, wherein said control means includes means adapted to effect actuation thereof upon positioning of an oriented crate intermediate said conveyors.

3. A lifting unit according to claim 2, wherein vertically rising guide means are disposed in spaced relationship to said inlet and are adapted to engage an oriented crate passing through said inlet to retain said crate in oriented position intermediate said conveyors, and said means adapted to actuate said control means includes crate feeler means positioned adjacent said vertically rising guide means and adapted to be moved into control means actuating position upon movement of a crate into engagement with said vertically rising guide means.

4. A lifting unit according to claim 2, wherein said continuously driven means is a hydraulic motor.

5. A lifting unit according to claim 2, wherein said unit is mounted adjacent a forward end of said vehicle, and said continuously driven means includes a drive shaft powered upon rotation of a ground engaging wheel of said vehicle.

6. A lifting unit according to claim 2, wherein said unit is adapted to be mounted adjacent the rear of said vehicle, and said means adapted to actuate said control means includes crate feeler means disposed in a spaced relationship to said inlet, said feeler means being engageable by an oriented crate passing through said inlet to retain said crate in oriented position intermediate said conveyors, and said feeler means when engaged being movable into a control means actuating position.

7. A lifting unit according to claim 6, wherein said unit additionally includes guide means rising vertically from adjacent said inlet, and said conveyor lifting means includes horizontally disposed crate positioning members adapted when said conveyors are driven to be moved inwardly and upwardly into supporting engagement with opposed sides of said positioned crate to effect lifting thereof in the direction of conveyor travel, said positioning members having inwardly turned end portions spaced from said vertically rising guide means and being adapted to cooperate therewith to constrain horizontal movement of said crates during lifting thereof.

8. A lifting unit according to claim 6, wherein parallelogram linkage means is provided to mount said unit adjacent the rear of said vehicle for relative vertical movement with respect thereto, and means are provided to move said mounted unit vertically relative to said vehicle to selectively control positioning of said unit with respect to the ground.

9. A lifting unit adapted to be mounted on a vehicle movable along a path of travel lengthwise of crop rows in order to bring said unit into engagement with harvested crop depository crates disposed on the ground between adjacent crop rows, which comprises: an elevator including a pair of spaced vertically traveling conveyors adapted to lift said crates from the ground, when positioned in an oriented position intermediate said conveyors adjacent a forwardly opening inlet of said elevator, and to convey lifted crates in succession upwardly while in horizontally arranged, vertically spaced relationship to an upper elevator outlet, said conveyors having a plurality of lifting means uniformly spaced apart in the direction of conveyor travel, individual lifting means of said spaced conveyors being disposed in horizontal alignment and being adapted during conveyor travel to be brought into lifting engagement with opposed sides of a positioned crate; guide means disposed adjacent said elevator inlet, said guide means when moved into engagement with a ground supported crate being adapted to effect orientation thereof such that said opposed sides thereof are disposed parallel to said path of vehicle travel and to guidingly direct said oriented crate through said elevator inlet into said oriented position intermediate said conveyors; means to synchronously drive said conveyors such that said conveyor lifting means are brought into lifting engagement with opposed sides of said positioned crate; parallelogram linkage means for mounting at least said elevator and guide means on said vehicle for relative vertical movement with respect thereto; shock absorber means for retarding downward vertical movement of at least said elevator and guide means with respect to said vehicle; and means for moving at least said elevator and guide means vertically relative to said vehicle to selectively control positioning thereof with respect to the ground.

10. A lifting unit adapted to be mounted on a vehicle movable along a path of travel lengthwise of crop rows in order to bring said unit into engagement with harvested crop depository crates disposed on the ground between adjacent crop rows, which comprises: an elevator including a pair of spaced vertically traveling conveyors adapted to lift said crates from the ground, when positioned in an oriented position intermediate said conveyors adjacent a forwardly opening inlet of said elevator, and to convey lifted crates in succession upwardly while in horizontally arranged, vertically spaced relationship to an upper elevator outlet, said conveyors having a plurality of lifting means uniformly spaced apart in the direction of conveyor travel, individual lifting means of said spaced conveyors being disposed in horizontal alignment and being adapted during conveyor travel to be brought into lifting engagement with opposed sides of a positioned crate; guide means disposed adjacent said elevator inlet, said guide means when moved into engagement with a ground supported crate being adapted to effect orientation thereof such that said opposed sides thereof are disposed parallel to said path of vehicle travel and to guidingly direct said oriented crate through said elevator inlet into said oriented position intermediate said conveyors; means to synchronously drive said conveyors such that said conveyor lifting means are brought into lifting engagement with opposed sides of said positioned crate; and vertically rising guide means, said vertically rising guide means being disposed in a spaced relationship to said inlet and adapted to engage an oriented crate passing through said inlet to retain said crate in oriented positioned intermediate said conveyors, said conveyor lifting means including horizontally disposed crate positioning members adapted when said conveyors are driven to move inwardly and upwardly into supporting engagement with opposed sides of said positioned crate to effect lifting thereof in the direction of conveyor travel, and said positioning members having vertically rising inwardly turned end portions spaced from said vertically rising guide means and adapted to cooperate therewith to constrain horizontal movement of said crates during lifting thereof.

11. A lifting unit according to claim 10, wherein said conveyor lifting means additionally includes support members, said support members being adapted to be brought into supporting engagement with a lower surface of said crate subsequent to lifting thereof by said positioning members.

References Cited

UNITED STATES PATENTS

| | | |
|---|---|---|
| 1,342,463 | 6/1920 | Sanwo. |
| 1,517,707 | 12/1924 | Castleman _____ 198—163 |
| 2,089,516 | 8/1937 | West et al. |

ALBERT J. MAKAY, Primary Examiner

U.S. Cl. X.R.

198—7, 163